Oct. 8, 1940.   W. G. COOK   2,217,432
PARALLEL OPERATION OF GENERATORS
Filed Aug. 13, 1938   3 Sheets—Sheet 1

WITNESSES:
C. F. Oberheim
Nw. C. Groome

INVENTOR
Willard G. Cook.
BY G. M. Crawford
ATTORNEY

Oct. 8, 1940.　　　　W. G. COOK　　　　2,217,432
PARALLEL OPERATION OF GENERATORS
Filed Aug. 13, 1938　　　3 Sheets-Sheet 3

WITNESSES:
E. F. Oberheim
Mrs. C. Groome

INVENTOR
Willard G. Cook.
BY J. M. Crawford
ATTORNEY

Patented Oct. 8, 1940

2,217,432

UNITED STATES PATENT OFFICE

2,217,432

PARALLEL OPERATION OF GENERATORS

Willard G. Cook, Wilkinsburg, Pa., assignor to Westinghouse Electric & Manufacturing Company, East Pittsburgh, Pa., a corporation of Pennsylvania Application August 13, 1938, Serial No. 224,681

7 Claims. (Cl. 171—224)

My invention relates, generally, to generator control systems and, more particularly, to a system for operating a plurality of direct current generators in parallel and maintaining a desired load division therebetween.

It is common practice to secure the desired load division between two direct current generators connected in parallel circuit relation to the load by providing each with a differential compounding field winding energized by its own load current, and a cumulative compounding field winding energized by the load current of the other generator. This method has been extended to three generators by providing each with a differential compounding winding energized by its own load current, and a cumulative compounding winding, each cumulative winding being energized by the load current of a different one of the other generators.

However, it has been found that the operation of more than three generators in parallel by this method introduces or permits hunting due to time lag in the correction of the voltage of the machines.

The object of my invention is to provide a system for operating any desired number of direct current generators in parallel which shall function to divide the load on the generators in any desired proportion.

Another object of my invention is to provide a system for operating any number of sets or groups of generators in parallel which shall function to divide the load between the generators in any desired proportion.

A further object of the invention is to provide a booster generator which shall function to generate a potential which is proportional to the algebraic sum of a plurality of currents and which has a minimum of field windings.

Another object of the invention is to provide a booster generator for generating a voltage proportional to the algebraic sum of a plurality of voltages which shall be of simple construction and economical to manufacture.

Figure 1:
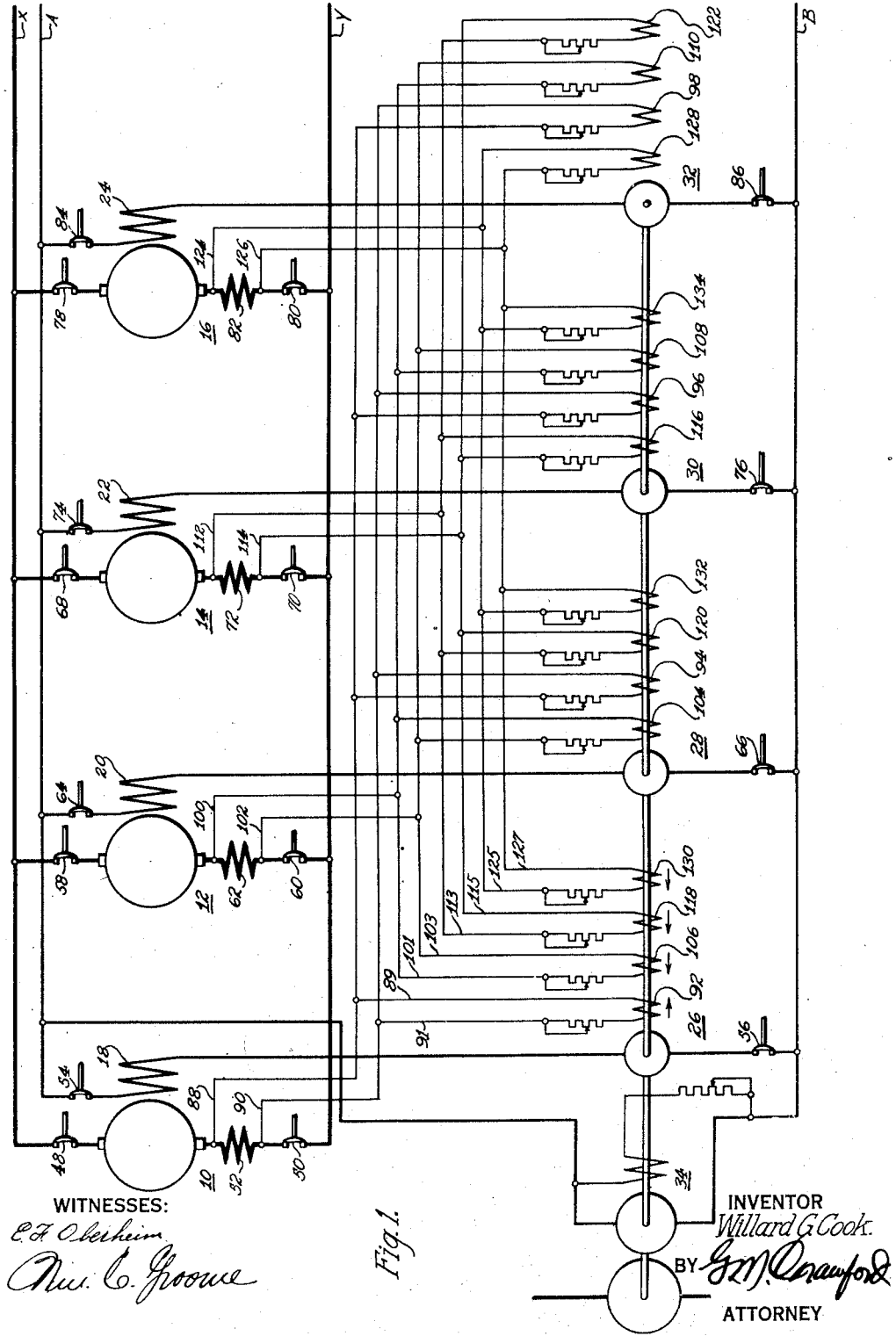
Figure 2:
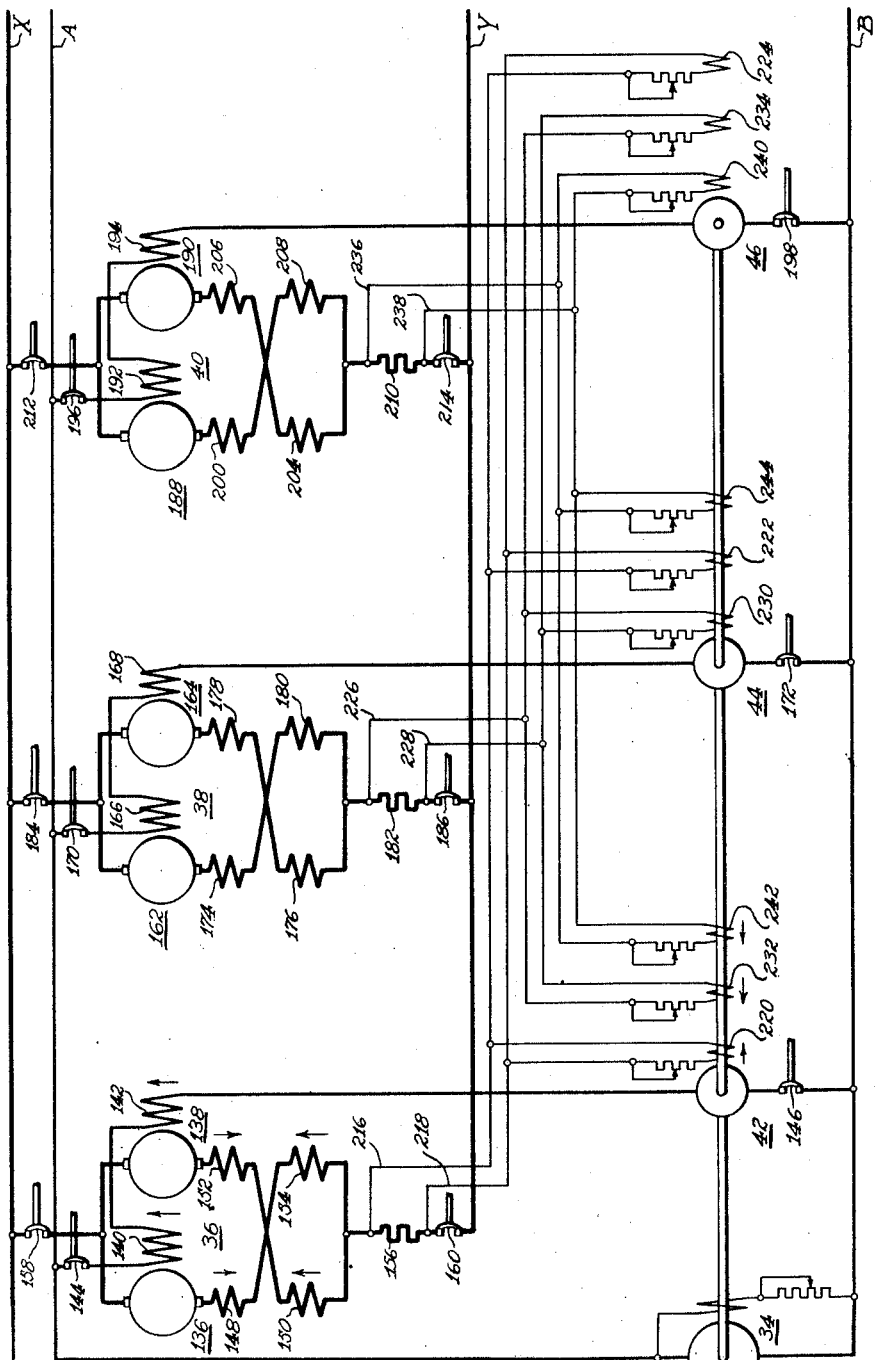
Figure 3:
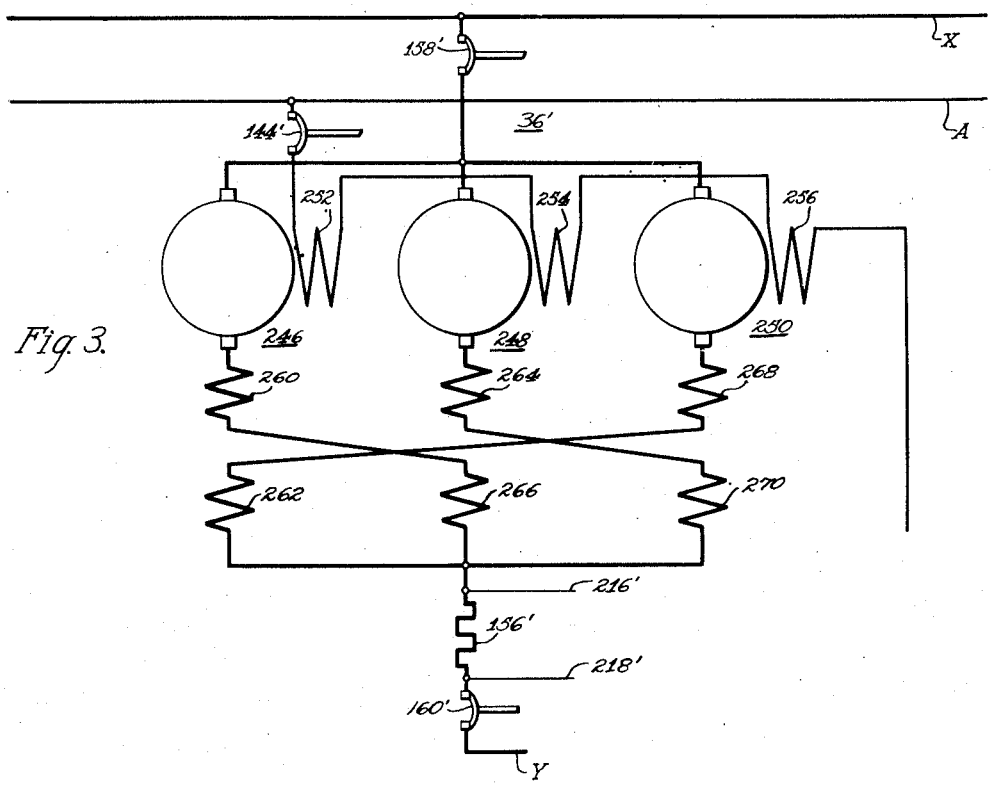
Figure 4:
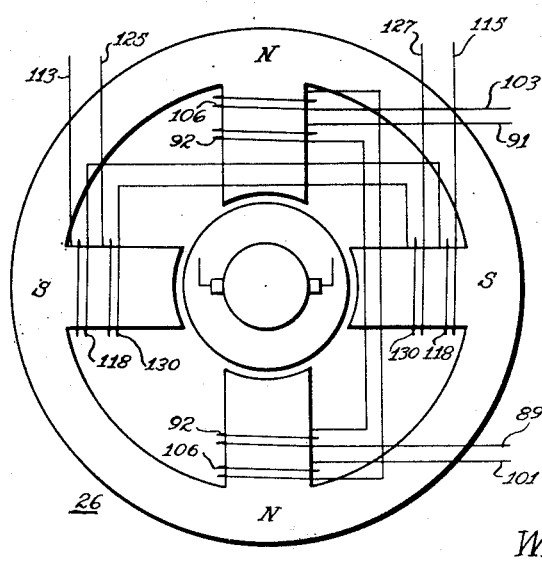

These and other objects and advantages of my invention are apparent from the following detailed description taken in connection with the accompanying drawings, in which Figure 1 is a diagrammatic representation of a system for operating a plurality of direct current generators in parallel embodying the principal features of my invention, Fig. 2 is a diagrammatic representation of a modification of the invention showing the principle of the invention applied to three sets of two direct current generators operated in parallel, Fig. 3 is a diagrammatic representation of another modification of the invention showing how the principle of the invention may be applied to sets of three generators operated in parallel, and Fig. 4 is a diagrammatic illustration of a simplified booster generator which may be used in carrying out my invention.

In practicing my invention in its preferred embodiment shown in Figure 1 of the drawings, a plurality of main generators 10, 12, 14 and 16 are connected in parallel circuit relation to the bus conductors X—Y. Each of the field windings 18, 20, 22 and 24 of the main generators is connected to be energized from the excitation bus A—B in series circuit relation with one of the auxiliary generators 26, 28, 30 and 32. The excitation bus A—B is energized at a substantially constant potential by a generator 34. Each of the auxiliary generators 26, 28, 30 and 32 is excited differentially in accordance with the load on its associated main generator and accumulatively in accordance with the loads on the other main generators.

In the embodiment of the invention shown in Fig. 2, pairs of generators 36, 38 and 40 each have differential and cumulative series windings cross connected to provide the desired load division between the two generators of the pairs in a well known manner. The field windings of the generators of each pair are connected across an excitation bus A—B in series circuit relation with auxiliary generators 42, 44 and 46. Each of the generators 42, 44 and 46 is excited differentially in accordance with the load on its associated main generator and accumulatively in accordance with the loads on the other main generators.

The generators may also be operated in groups of three as shown in Fig. 3, each generator of the group having differential and cumulative series field windings cross-connected to secure load division between the three generators of the group, the main field windings being connected in series circuit relation to be energized across an excitation bus in series with an auxiliary generator similar to the system shown in Fig. 2.

The auxiliary generators may take the form of a specially designed generator shown in Fig. 4 in which the several field windings are so distributed upon the field poles of the generator as to require a minimum of field coils to provide the desired excitation for the generator.

Referring to Fig. 1 for a more detailed description of the invention, the generator 10 is connected by suitable circuit breakers 48 and 50 to the power bus X—Y through its interpole winding 52. The main field winding 18 of the generator 10 is connected by suitable circuit breakers 54 and 56 to a suitable source of direct current A—B through the armature of the auxiliary generator 26.

In a like manner the armature of the generator 12 is connected by means of suitable circuit breakers 58 and 60 to the bus X—Y through its interpole winding 62, and circuit breakers 64 and 66 function to connect the field winding 20 to the source of power A—B through the armature of the auxiliary generator 28. The armature of the generator 14 is also connected across the bus X—Y by means of suitable circuit breakers 68 and 70 through its interpole winding 72 and the main field winding 22 is connected in series circuit relation with the auxiliary generator 30 across the source of current A—B by means of circuit breakers 74 and 76. The circuit breakers 78 and 80 function to connect the generator 16 across the bus X—Y through its interpole winding 82 and the circuit breakers 84 and 86 connect the main field winding 24 in series circuit relation with the auxiliary generator 32 of the source of power A—B.

The interpole winding 52 of the generator 10 is connected by means of conductors 88, 89, 90 and 91 to a field winding 92 of the auxiliary generator 26, the field winding 92 being connected differentially so that increases in the current flow in the armature of the generator 10 will cause increased potential drop across the interpole winding 52 and thus will tend to decrease the excitation of the auxiliary generator 26. The interpole winding 52 has also connected with it in parallel circuit relation, the field windings 94, 96 and 98 of the auxiliary generators 28, 30 and 32, respectively, the windings 94, 96 and 98 being connected cumulatively so as to increase the excitation of the auxiliary generators 28, 30 and 32 upon increase of current flow of the armature of the generator 10. In a similar manner the interpole winding 62 of the generator 12 is connected by conductors 100, 101, 102 and 103 to a cumulative field winding 106 of the auxiliary generator 26. The interpole winding 62 is also connected in parallel circuit relation with a differential field winding 104 of auxiliary generator 28 and cumulative field windings 108 and 110 of the auxiliary generators 30 and 32, respectively.

The interpole winding 72 of the main generator 14 is connected by means of the conductors 112, 113, 114 and 115 to a cumulative winding 118 of the auxiliary generator 26 and is connected to the differential field winding 116 of the auxiliary generator 30 and cumulative field windings 120 and 122 of auxiliary generators 28 and 32. The conductors 124, 125, 126 and 127 connect the cumulative field winding 130 of the auxiliary generator 26 across the interpole winding 82 of the main generator 16, and the interpole winding 82 is also connected in parallel circuit relation with the differential field winding 28 of the auxiliary generator 32 and the cumulative field windings 132 and 134 of the auxiliary generators 28 and 30.

In the operation of the system of Fig. 1 if, for any reason, one of the main generators connected to the bus X—Y should assume more than the amount of load it is desired to have it carry, the potential of the generator will be decreased and the potential of the rest of the generators of the group will be increased to thus shift some of the load to the other generators. If, for instance, the generator 10 should suddenly pick up more than its share of the load on the bus X—Y, the energization of the differential field winding 92 of auxiliary generator 26 will be increased due to the increased flow of current in the interpole winding 52 and, therefore, the increased potential drop across this interpole winding. This will cause a decrease in the output potential of the auxiliary generator 26 and will thus effect a decrease in the current flow in the field winding 18 of the generator 10 and, therefore, a decrease in the potential output of the generator 10. At the same time the current flow in the cumulative field windings 94, 96 and 98 of the auxiliary generators 28, 30 and 32, respectively, will be increased which will effect an increase in the potential output of the auxiliary generators 28, 30 and 32. This increased potential output of these auxiliary generators will cause an increased current flow in the main field winding 20, 22 and 24 of the main generators 12, 14 and 16, thus causing an increase in the potential output of the main generators 12, 14 and 16. The decrease in the potential output of the main generator 10 will effect a decrease in the flow of its armature current and will thus decrease its load. In a like manner, the increase in the potential output of the main generators 12, 14 and 16 will cause increased current flow in the armatures of these generators and will cause them to increase their loads.

The same conditions will obtain when any one of the main generators 10, 12, 14 and 16 tends to pick up more than its share of the load or to carry less than its share of the load. If the load on the bus X—Y is constant, a further automatic adjustment will be made when one of the main generators tends to carry more or less than the load it is desired to have it carry. For instance, if there is a constant load on the bus X—Y and the main generator 10 should increase its load to carry more than its predetermined share of the total load on the bus, there will necessarily be a decrease in the load on the other main generators 12, 14 and 16 at the same time. The increase in the load on the main generator 10 will decrease the excitation of that generator, as hereinbefore described, and the decrease of the load on the generators 12, 14 and 16 will further decrease the excitation of the generator 10 by decreasing the energization of the cumulative field windings 106, 118 and 130 of the auxiliary generator 26. At the same time the excitation of the other main generators 12, 14 and 16 will be increased by the decreased energization of the differential field windings 104, 116 and 128 of the auxiliary generators 28, 30 and 32, which are associated with the main generators 12, 14 and 16, respectively.

The cumulative and differential field windings of the auxiliary generators 26, 28, 30 and 32 may be so designed as to provide any desired relation between the field strengths provided by these windings so as to produce any desired voltage-load characteristic of the group of main generators, and various resistances are provided as shown in circuit with each of the field windings of the auxiliary generators so that any desired relation between the current strengths and the several field windings may be attained.

In the system shown in Fig. 2, three groups of two generators each, 36, 38 and 40 are employed to supply electrical power to the bus X—Y.

Group 36 of these generators comprises generators 136 and 138 having field windings 140 and 142, respectively, connected to the source of direct current A—B by means of any suitable circuit breaker 144 and 146 through an auxiliary generator 42. The main generator 136 has series field windings 148 and 150 and the main generator 138 has series field windings 152 and 154. The field windings 148 and 152 are differential series windings connected in series circuit relation with the armatures of the generators 136 and 138, respectively, and the field windings 150 and 154 are cumulative series windings connected in series circuit relation with the armatures of the generators 136 and 138, respectively. The group of generators 36 comprising the parallel connected main generators 136 and 138, is connected in series circuit relation with a shunt resistance 156 to the bus X—Y by means of circuit breakers 158 and 160. The group of generators 38 comprises main generators 162 and 164 having main field windings 166 and 168, respectively, connected by means of suitable circuit breakers 170 and 172 in series circuit relation with auxiliary generator 144 across the bus A—B. The main generator 162 has differential and cumulative series field windings 174 and 176, respectively, and main generator 164 has differential and cumulative series fields 178 and 180, respectively. The field windings 174 and 180 are connected in series circuit relation to the armature of the main generator 162 and the field windings 178 and 176 are connected in series circuit relation with the armature of the main generator 164. The main generators 162 and 164 are connected in parallel circuit relation and comprise group 38 which is connected in series circuit relation with a shunt resistance 182 to the bus X—Y by means of circuit breakers 184 and 186.

In a like manner the generators 188 and 190 comprising group 40 have main field windings 192 and 194 connected by means of suitable circuit breakers 196 and 198 in series circuit relation with the auxiliary generator 46 across the bus A—B in differential and cumulative series field windings 200 and 204 and 206 and 208, respectively, cross-connected as hereinbefore described in connection with groups of generators 36 and 38. The generators 188 and 190 of the group 40 are connected in parallel circuit relation and the group 40 is connected in series circuit relation with a shunt resistance 210 to the bus X—Y by means of circuit breakers 212 and 214.

The shunt resistance 156 associated with the generator group 36 is connected by means of conductors 216 and 218 to a differential field winding 220 of auxiliary generator 42 and cumulative field windings 222 and 224 of auxiliary generators 44 and 46, respectively. In a like manner the shunt resistance 182 associated with generator group 38 is connected by means of conductors 226 and 228 in parallel circuit relation with the differential field windings 230 of the auxiliary generator 44 and the cumulative field windings 232 and 234 of the auxiliary generators 44 and 46, respectively. The shunt resistance 210 associated with generator group 40 is connected in parallel circuit relation to the differential field winding 240 of the auxiliary generator 46 in the cumulative field windings 242 and 244 of the auxiliary generators 42 and 44, respectively, by means of conductors 236 and 238.

In the operation of this embodiment of the invention, the generators of each of the groups 36, 38 and 40 will maintain a predetermined division of the load between the two main generators of the group by virtue of the cross connection of their series and cumulative field windings. Thus, should the load on main generator 136 increase, its differential field excitation will decrease to decrease its potential output and thus decrease its load. At the same time the cumulative excitation of the main generator 138 will increase to increase its potential output, thus increasing its load. In a like manner any change in the load on either main generator 136 or 138 will so affect both main generators as to cause them to maintain a predetermined division of the load.

In a similar manner, the generators of groups 38 and 40 will maintain a predetermined load division between the two generators of each group. If, now, the load on group 36 of the main generators should increase, it will be seen that the excitation of the auxiliary generators 42, 44 and 46 will be so affected by the increased potential drop across the shunt resistance 156 as to cause the group of main generators 136 to decrease its potential output and therefore its load and the groups of main generators 38 and 40 to increase their potential outputs and thus their loads. Thus, the groups of main generators 36, 38 and 40, with their associated auxiliary generators 32, 34 and 36 will function in the same manner as the separate main generators 10, 12, 14 and 16 and their associated auxiliary generators 26, 28, 30 and 32 shown in Fig. 1 and described in detail hereinbefore.

If it is so desired all of the main generators which are to be operated to supply power to a common bus may be divided into groups of three each, the load division between the several groups being controlled by the system shown in Fig. 2 and the load division between the generators of the separate groups being controlled by the system shown in Fig. 3. The group of main generators 36' of Fig. 3 comprises main generators 246, 248 and 250 connected in parallel circuit relation to the power bus X—Y through circuit breakers 158' and 160' and having main field windings 252, 254 and 256, respectively, connected by means of circuit breaker 144' in series circuit relation to a source of direct current power, one side of which is indicated by the reference character A in series circuit relation with a suitable auxiliary generator, not shown, similar to auxiliary generator 42 of Fig. 2, which receives its excitation from a resistance shunt 156' in series circuit relation with the group of generators 36' and similar shunt resistances in series circuit relation with the other groups of three generators each connected to the common bus. The main generator 246 has differential and cumulative series field windings 260 and 262, the generator 248 has differential and cumulative series field windings 264 and 266 and the generator 250 has differential and cumulative series field windings 268 and 270, respectively. The field windings 260 and 266 are cross connected in series circuit relation, field windings 264 and 270 are cross connected in series circuit relation, and the field windings 268 and 262 are also cross connected in series circuit relation.

With these connections of the series field windings of the three generators it will be seen that an increase in the load on any one will automatically decrease the excitation of the one generator and increase the excitation of the other two generators to thus automatically decrease the load on the one generator and increase the load on the other two generators. As an example, suppose that generator 248 should assume more than its proportionate share of the total load on the group of generators 36'. This would increase its differential excitation and thus decrease its potential output and at the same time the cumulative excitation of generator 250 would be increased to increase its potential output. This would increase the load on generator 250 which, in turn, would affect the cumulative field winding 262 of generator 246 to cause this generator to increase its potential output and hence cause it to pick up more load. In this manner the cross connection of the series field windings will maintain the predetermined load relation between the three generators, and the load division between the groups of three generators will be maintained in the manner described in detail in connection with the system of Fig. 2.

Instead of providing an auxiliary generator with four coils on each field pole, the auxiliary generators may be constructed as shown in Fig. 4. With this form of construction it will be seen that each field pole has but two windings, the windings on this generator being indicated as the windings of the auxiliary generator 26 associated with the main generator 10 in the system of Fig. 1 and the same reference characters being applied to these windings and the connections thereto. It will be seen by reference to Fig. 4 that the north magnetic poles of the four-pole generator 26 each have a section of the differential field winding 92 and a section of the cumulative field winding 106 disposed thereon, and the sections of the cumulative field windings 118 and 130 are disposed on each of the south magnetic poles of the generator, the two sections of each of the windings being connected in series circuit relation. With this arrangement of the field windings of the auxiliary generator 26, the generator will maintain a potential output proportional to the algebraic sum of the excitations of the generator by the field windings 92, 106, 118 and 130 without having to mount a portion of each of the field windings upon each of the field poles of the generator.

In the event that it is desired to operate less than the total number of generators shown in Fig. 1 or less than the number of group generators shown in Fig. 2, the desired generators or group of generators may be disconnected from the bus X—Y and their associated auxiliary generators and field windings disconnected from the bus A—B. In this event it will be necessary to adjust the various resistances in circuit with the field windings of the auxiliary generators which remain in service to provide the desired proportionate cumulative and differential excitation for these auxiliary generators, since the field windings of the auxiliary generators which are connected to be energized by the generators or groups of generators which are out of service will no longer be energized and will no longer provide their share of the excitation of the auxiliary generators.

It will be seen that I have provided a system for operating a plurality of generators in parallel which shall function to divide the load between the generators in any desired proportion and to automatically maintain the desired load division between the generators which is readily adjustable for any desired load division, which is simple in operation and inexpensive to manufacture, install and maintain.

In compliance with the requirements of the patent statutes, I have shown and described herein the preferred embodiments of my invention. It is to be understood, however, that the invention is not limited to the precise constructions shown and described, but may be modified by one skilled in the art, the embodiments herein shown being illustrative of the principles of my invention.

I claim as my invention:

1. In a system for dividing the load between direct current generators operated in parallel, a plurality of main generating means, exciting means for each of said main generating means connected to a source of electrical energy, a continuously driven booster generator connected in series circuit relation with each of said exciting means, means providing excitation for each of said booster generators proportional to the load on its associated generating means and of such polarity as to decrease the excitation of its associated generating means, and means providing excitation for each of said booster generators proportional to the sum of the loads on the generating means other than its associated generating means and of such polarity as to increase the excitation of its associated generating means.

2. In a system for dividing the load between a plurality of parallel operated generators, means for producing the desired load division between the generators of selected sets of the generators, and means for producing the desired load division between the sets of generators comprising means providing differential excitation for each of the sets of generators proportional to the load on the set of generators and means providing cumulative excitation for each of the sets of generators proportional to the sum of the loads on the other sets of generators.

3. In a system for dividing the load between a plurality of parallel operated generators, means for producing the desired load division between the generators of selected sets of the generators, and means for producing the desired load division between the sets of generators comprising exciting means for each set of generators, a continuously driven booster generator connected in series circuit relation with each of said exciting means, means providing excitation for each of said booster generators proportional to the load on its associated set of generators and of such polarity as to decrease the excitation of its associated set of generators, and means providing excitation for each of said booster generators proportional to the sum of the loads on sets of generators other than its associated set of generators and of such polarity as to increase the excitation of its associated set of generators.

4. In a system for dividing the load between a plurality of direct current main generators operated in parallel, exciting means for each of the main generators, a continuously driven booster generator connected in series circuit relation with each of said exciting means, and exciting means for each of said booster generators comprising a field winding connected to excite the booster generator in accordance with the load on its associated generator and with a polarity such as to cause a decrease in the excitation of its associated generator, and a plurality of field windings each connected to excite the booster generator in accordance with the load on a separate one of the other generators and with a polarity such as to cause an increase in the excitation of its associated generator.

5. In a system for dividing the load between a plurality of direct current main generators operated in parallel, means for dividing the load as desired between the generators of selected sets of generators, exciting means for each of the sets of generators, a continuously driven booster generator connected in series circuit relation with each of said exciting means, and exciting means for each of said booster generators comprising a field winding connected to excite the booster generator in accordance with the load on its associated set of generators and with a polarity such as to cause a decrease in the excitation of its associated set of generators, and a polarity of field windings each connected to excite the booster generator in accordance with the load on a separate one of the other sets of generators and with a polarity such as to cause an increase in the excitation of its associated set of generators.

6. In a system for dividing the load between a plurality of direct current main generators operated in parallel, exciting means for each of the main generators, a continuously driven booster generator connected in series circuit relation with each of said exciting means, and exciting means for each of said booster generators comprising a field winding connected to excite the booster generator in accordance with the load on its associated generator and with a polarity such as to cause a decrease in the excitation of its associated generator, and a plurality of field windings each connected to excite the booster generator in accordance with the load on a separate one of the other generators and with a polarity such as to cause an increase in the excitation of its associated generator, each of said booster generators comprising a series wound armature and said separate field windings being placed on pairs of field poles of the same polarity.

7. In a system for controlling the load on a plurality of parallel operated generating units, means for producing the desired load division between the generating units comprising exciting means for each of the units, a continuously driven booster generator connected in series circuit relation with the exciting means of each of said units, means providing excitation for each of said booster generators proportional to the load on its associated generating unit and of such polarity as to decrease the excitation of its associated generating unit, and means providing excitation for each of said booster generators proportional to the sum of the loads on generating units other than its associated generator unit and of such polarity as to increase the excitation of its associated generator unit.

WILLARD G. COOK.